US005484151A

United States Patent [19]

Tholkes

[11] Patent Number: 5,484,151

[45] Date of Patent: Jan. 16, 1996

[54] MOBILE STANDING AID

[76] Inventor: Alan L. Tholkes, 913 S. Washington, Redwood Falls, Minn. 56283

[21] Appl. No.: 154,608

[22] Filed: Nov. 18, 1993

[51] Int. Cl.[6] .............................. A61G 5/00; B62M 1/14

[52] U.S. Cl. .............................. 280/250.1; 297/DIG. 4; 297/DIG. 10

[58] Field of Search .............................. 280/250.1, 304.1; 297/DIG. 10, DIG. 4

[56] References Cited

U.S. PATENT DOCUMENTS 4,732,402 3/1988 Lambert .............................. 280/250.1
4,744,578 5/1988 Stearns .............................. 280/250.1
4,861,059 8/1989 Shirk .............................. 280/304.1
4,968,050 11/1990 Kenrick et al. .............................. 280/250.1
5,172,925 12/1992 Kendrick et al. .............................. 280/250.1
5,242,180 9/1993 Bergeron .............................. 280/250.1
5,265,689 11/1993 Kauffmann .............................. 297/DIG. 10
5,294,027 3/1994 Plastina .............................. 280/304.1
5,340,139 8/1994 Davis .............................. 280/250.1

*Primary Examiner*—Mitchell J. Hill
*Attorney, Agent, or Firm*—D. L. Tschida

[57] ABSTRACT

A personal support assembly accessible to a wheel chair bound user to support and elevate the user from a seated to an erect posture. A telescoping support column includes an adjustable tabletop, padded chest and leg supports and a pivotally mounted seat and hip support. A base frame includes transport wheels and a foot support. A manually controlled hydraulic lift pivots a cantilevered support arm to the seat support. A base frame of a stationary construction includes transport wheels and a clamped boot restraint. In a user maneuverable construction, a pair of hand wheels independently direct assembly movement via locking drive belt assemblies.

23 Claims, 7 Drawing Sheets

MOBILE STANDING AID

BACKGROUND OF THE INVENTION

The present invention relates to rehabilitation devices for the handicapped, and in particular, to a lift and standing support for wheel chair bound users having relatively limited upper body muscle control.

Over time, wheel chair users and other individuals with limited lower trunk or leg control functions, typically experience a progressive atrophy of the leg and calf muscles. Without ongoing physical therapy or the aid of an attendant, these individuals have difficulty achieving a measure of activity sufficient to maintain circulation to the legs and consequent muscle tone.

A solution to the dilemma is to mechanically support the individual in an upright posture. Restraining the legs and trunk of the individual in such a condition, allows the legs to support the individual's body weight. Such activity, in turn, exercises the muscles with consequent blood flow to the exercised limbs.

One assembly which permits the foregoing activity is disclosed in U.S. Pat. No. 5,054,852 and is sold under the brandname EASYSTAND by Altimate Medical, Inc. of Redwood Falls, Minn. Although commercially successful, the present invention discloses improvements to the foregoing. Particular improvements are provided at the lift assembly and the addition of provisions to facilitate frame adjustment, assembly transport and permit user mobility.

Another stationary stand of which applicant is aware provides a telescoping hydraulic support column, which cooperates with a sling that acts as a seat and hip support. The sling and lift assemblies do not provide a rigid support to the user and are believed rather awkward and cumbersome in use, especially for a wheel chair bound user.

Two other mobile, standing supports of which applicant is aware provide user operated chain drive linkages. The assemblies do not include active lift mechanisms. Instead, a user must possess a degree of coordination and upper body muscle control to lift himself or herself into an erect posture. Once erect, the user must also be capable of pivoting or strapping certain restraints into position to maintain the erect posture.

With the exception of the foregoing, applicant is not familiar with any device which provides a combinational arrangement and/or the advantages of the present invention.

In contrast to known assemblies, users with appreciably less muscle control and coordination are capable of using the present invention. The present invention particularly provides a rigid assembly to support the user through the entire lifting process, from chair transfer until fully erect, and to comfortably restrain the user, once erect. No additional muscle control is required, other than already exists to operate the wheel chair from which the user transfers himself or herself.

SUMMARY OF THE INVENTION

It is a primary object of the present invention to provide an assembly which is easily accessed by wheel chair bound users or the handicapped to support and raise a user from a seated to an upright standing posture.

It is a further object of the invention to provide an assembly that accommodates user transfer from a wheel chair to a seat support.

It is a further object of the invention to provide a seat support which includes a cantilevered, hydraulically actuated support arm to raise and lower the user between fully erect and seated postures.

It is a further object of the invention to provide a standing support which may be transported or maneuvered about a user site.

It is a further object of the invention to provide an adjustable foot support which includes a frame clamp.

It is a further object of the invention to provide an assembly which includes a manual, user controlled drive system.

It is a further object of the invention to provide independent drive systems having drive belts, frame mounted belt tensioners, a hand wheel and a drive wheel.

It is a further object of the invention to provide a drive system including wheel locks.

Various of the foregoing objects, advantages and distinctions of the invention are particularly obtained in alternative constructions which are described in detail with respect to the appended drawings.

In a transportable construction, a base frame includes a telescoping longitudinal member and a pair of transverse stabilizers. Wheels project from forward stabilizers to facilitate transport. A longitudinal frame clamp includes a foot restraint. The base frame supports a telescoping vertical support column.

The vertical support column extends from the base frame at a gusset bracket. A tabletop is secured to the upper end of the vertical column and a chest support telescopes from a table support frame. A number of aligned holes and a clamp fix the column height. A padded support having a pair of vertical channels supports each leg of the occupant.

A seat and hip support pivotally mounts at a lift arm to the column and rotates between a lowermost transfer position and an uppermost standing support position. A hand actuated hydraulic pump pivots the cantilevered lift arm to direct the seat between horizontal and vertical alignments of the user at corresponding seated and standing postures.

The hydraulic lift includes a two-way pump arm which rotates from a center neutral position to induce a lift operation with a pulling action and to release an extended piston with a pushing action. A spring biases the lift arm to the neutral position. Release operation rotates a linkage plate to engage a modified valve stem at the pump to control the descent of the seat and hip support.

In a mobile construction, drive wheels are secured to transverse stabilizers of a fixed length base frame which contains an elevated foot platform. Independent drive linkages extend between left and right hand wheels and drive wheels. A drive belt mates with pulleys secured to the hand and drive wheels. A threaded tensioner mounts within drive columns to adjust the position of a hand wheel axle. A spring biased latch pin mates to a number of apertures at each hand wheel to independently lock each drive.

An accessory basket projects from the vertical support column at transverse wing members.

Still other details, objects, advantages and distinctions of the invention will become more apparent upon reference to the following description with respect to the appended drawings. As various modifications and improvements may have been considered, they are described as appropriate. The description should not however be strictly construed in limitation to the spirit and scope of the invention, which rather should be interpreted within the scope of the appended claims.

DESCRIPTION OF THE PREFERRED EMBODIMENTS

Figure 1:
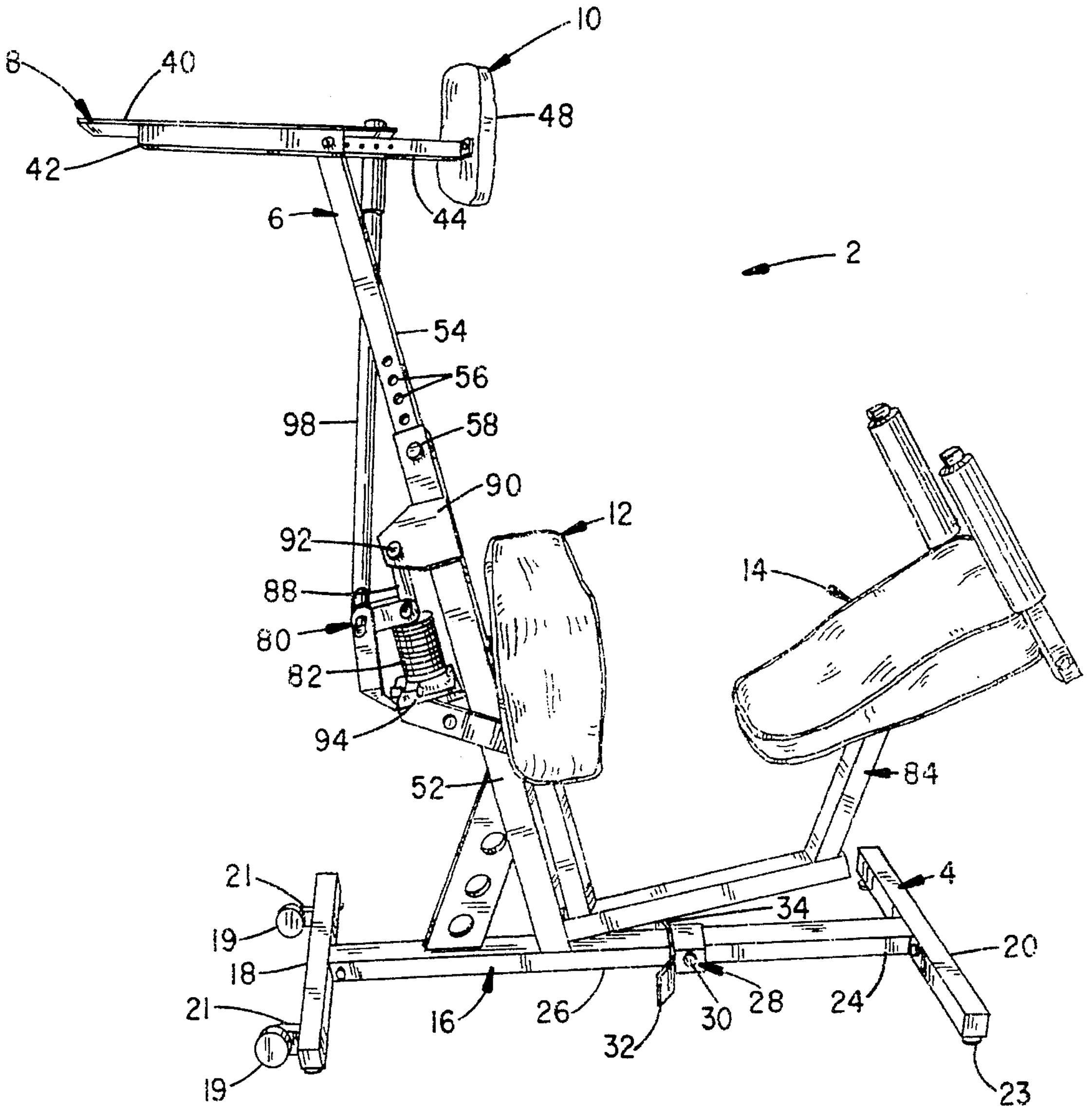
FIG. 1 is a perspective drawing showing a stationary standing aid.
Figure 2:
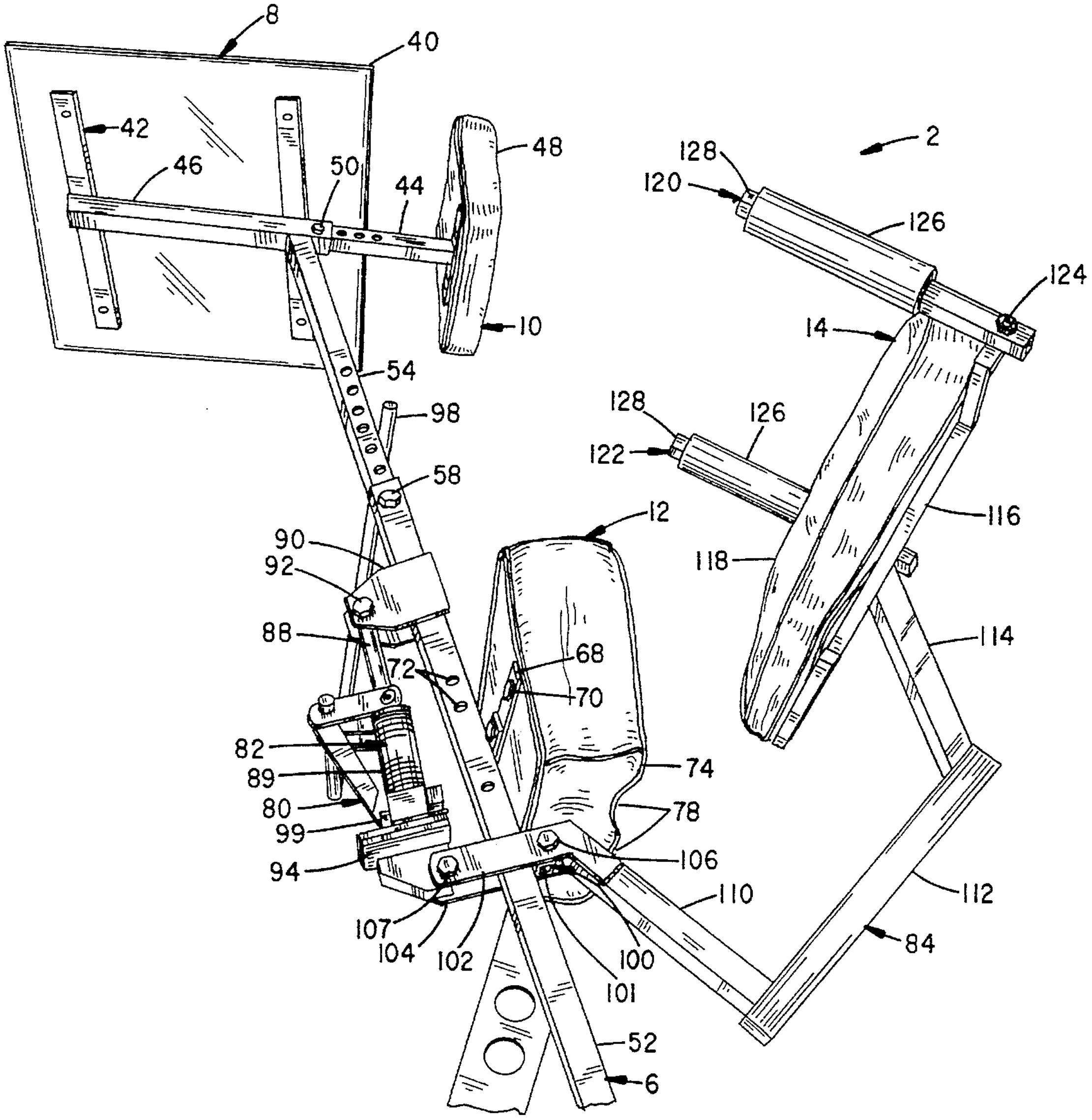
FIG. 2 is a perspective drawing showing the hydraulic lift and seat/hip support.

Referring to FIGS. 1 and 2, perspective drawings are shown of a portable standing aid 2. The aid 2 is constructed of a base 4, a vertical support column 6 and a tabletop or working platform 8, which may also be used to support a user's elbows. The column 6 is secured to the base 4 at a gusset bracket. Telescoping from beneath the table 8 is a padded chest support 10. A leg support 12 is secured to the column 6, along with a pivoting, hydraulically controlled seat/hip support 14.

The base frame 4 includes a telescoping longitudinal frame piece 16. Fore and aft stabilizers 18 and 20 transversely project from the longitudinal member 16. A pair of wheels 19 project from axle brackets 21 that are permanently secured to the stabilizer 18 and which permit manual transport of the assembly 2. That is, upon grasping and rotating the support column 6 forward, the weight of the assembly 2 is shifted onto the wheels 19, which raises the stabilizer 18 and permits a user or an attendant to move the assembly 2. The base frame 4 occupies a space of approximately 29×36 inches.

The stabilizer 20 and/or 18, depending upon the construction, includes multiple, height adjustable support pads 23. A surface material of the pads 23 can be varied to the ground condition. Preferably the pad material prevents movement of the base 4 during use of the assembly 2.

The frame piece 16 includes a pair of tubular pieces 24 and 26 which telescope from one another. An appropriate length of the frame piece 16 is established with a clamping foot or heel stop 28 which mounts over the frame piece 26. A cooperating threaded draw fastener 30 mounts through the stop 28 to compressively fix a desired length. Although not provided, the stabilizers 18 and/or 20 can be made length adjustable.

The position of the stop 28 can also be adjusted along the frame piece 26 to accommodate the feet. A pair of formed wing pieces 32 and 34 transversely project from the stop 28 to contact and restrain the user's heels. The wing members 32, 34 particularly prevent the user's feet from slipping backward to maintain a stable foot position, during lifting and once the user is fully erect and the legs are supported to the leg support 12.

The tabletop 8 is constructed of a platform 40 which is secured to a tubular H-shaped frame 42. The platform 40 can be constructed to any size and of any variety of materials.

Presently a 16×24 inch surface is provided which is constructed from a ⅜" thick acrylic stock.

A member 44 telescopes from a cross piece 46 of the frame 42. A padded chest support 48 telescopes from the member 44. The relative mounting position or displacement of the pad 48 from the platform 40 is determined via a clamp 50. A vertical adjustment may also be provided at the member 44, although is not presently required due to the adjustable nature of the column 6, described below.

The chest support 10 is presently constructed to be extensible over a range of approximately 3 to 6 inches. The support 10 provides a support surface of approximately 7×12 inches and is approximately one inch thick.

The support column 6 includes a base piece 52 and a telescoping extension piece 54. The base piece 52 is secured to the longitudinal member 16 at a gusset bracket. A number of holes 56 in the extension piece 54 selectively establish the extension of the support 6 relative to the base 4 at a threaded fastener 58 and mating retainer. A compressive clamp action is obtained with the fastener 58. The height of the column 6 is adjustable over an approximate range of 40 to 52 inches.

The leg support 12 is adjustably secured to the column piece 52 at a bracket 68 with appropriate bolt fasteners 70. The bracket 68 is welded to the column 52, although may be mounted to a clamp or at apertures 72 to permit adjustment of the leg support 12 along the column piece 52.

A leg support cushion 74 is mounted to the bracket 68 and provides a contoured 10×16 inch padded surface. The forward face of the surface includes a pair of vertical channels 78. The channels 78 conform about the knee and shin region of the occupant's legs and laterally restrain movement of the legs.

Figure 3:
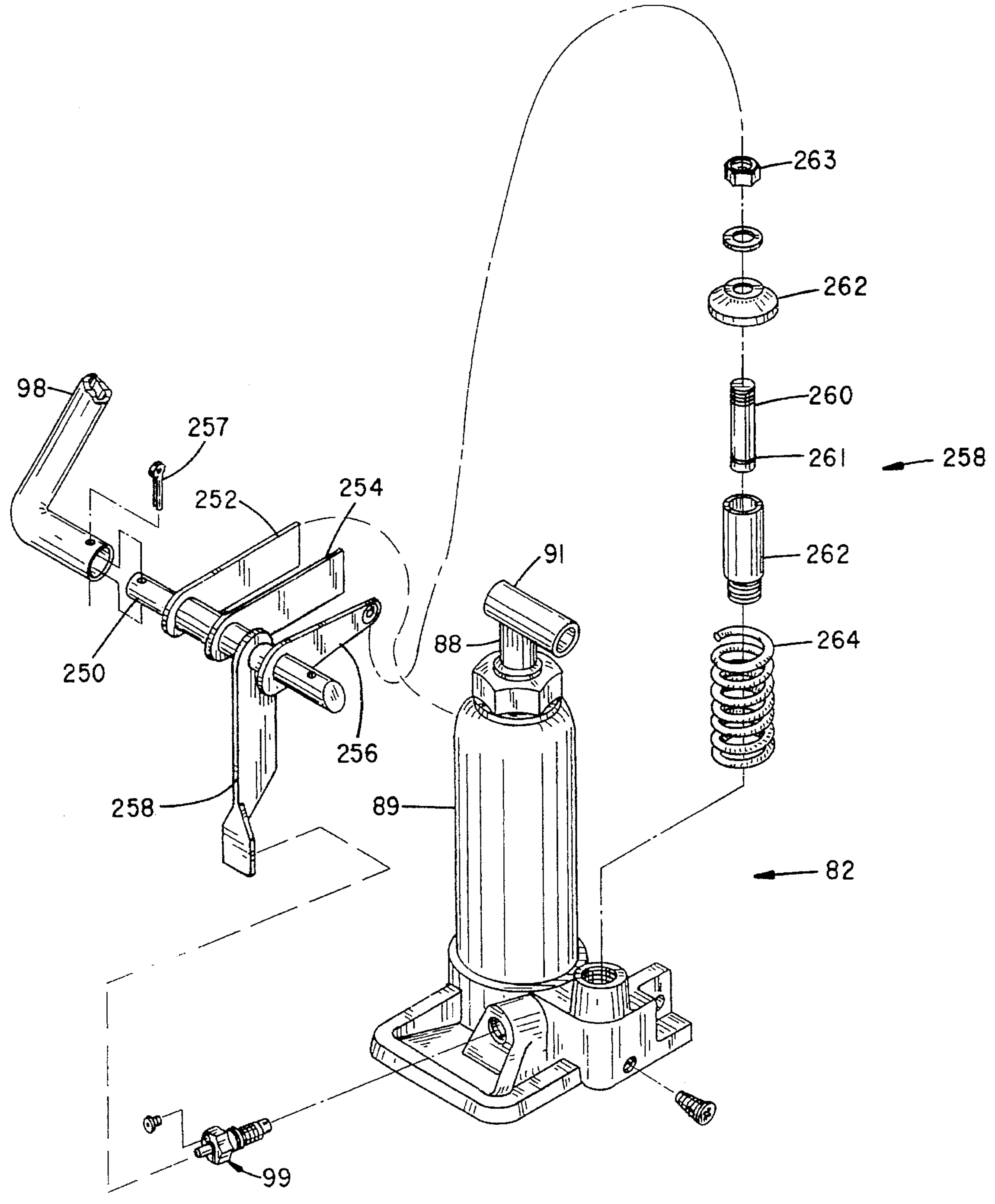
FIG. 3 is a perspective drawing of the hydraulic pump assembly.
Figure 4:
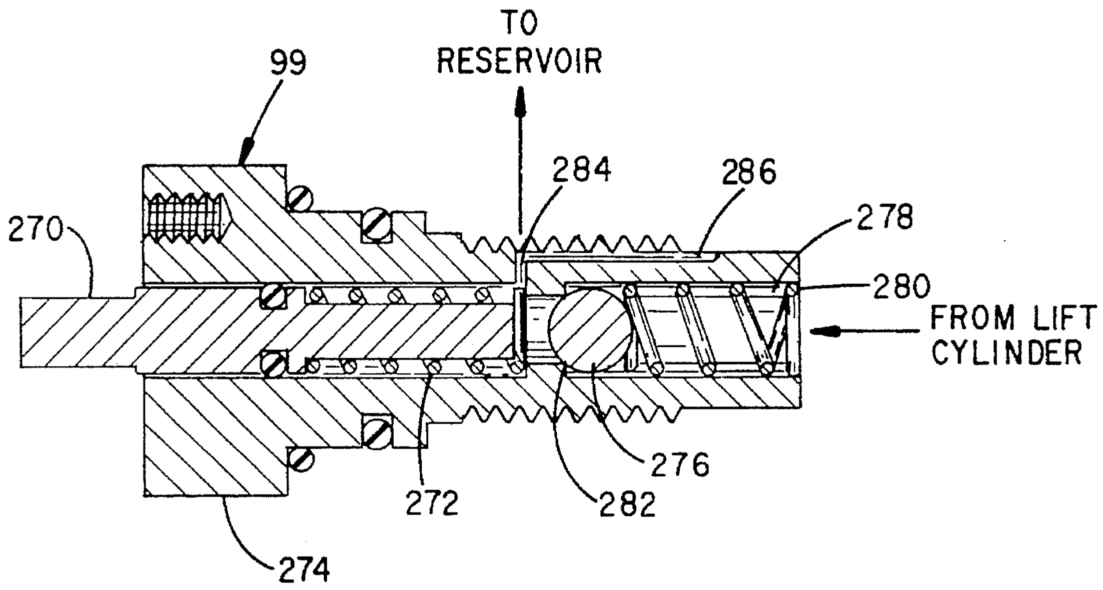
FIG. 4 is a cross-section drawing of an axially directed hydraulic relief valve.

Secured to the column 6, opposite the leg support 12, is a hydraulic lift assembly 80. The lift 80 includes a hydraulic pump 82 and cantilevered lift arm 84. The pump 82 comprises a so called "bottle jack" which has been modified to permit the supported user to manually raise and lower the lift arm 84. More of the details of the pump 82 are shown at FIGS. 3 and 4 and to which attention is also directed.

A piston 88 extends from a pump body 89 and is secured to an upper shackle 90 at the column piece 52 with a through bolt 92. The bolt 92 extends through a bushing 91 secured to the end of the piston 88. The shackle 90 anchors the pump 82 to the assembly 2.

The pump body 89 is secured to a plate 94 at one end of the lift arm 84. Extension and retraction of the piston 88 rotates the arm 84. Rotation is determined with a tubular pump handle 98 that extends to a preferred side of the column 6. The handle 98 can be mounted to accommodate either right or left hand operation. The handle 98 is also shaped to facilitate a manual pump action by the occupant in either a seated or standing posture.

The pump 82 provides a range of extension from 0 to 5 inches. In combination with the depicted shape of the arm 84, the pump 82 permits rotation of the arm 84 to vary the position of the seat/hip support 14 between a fully lowered horizontal orientation to a fully raised vertical orientation and to transport the occupant from a seated to a standing posture.

The handle 98 mounts to a pivot rod 250 that rotates in a pair of link arms 252, 254 that are welded to the pump body 89. A pin fastener 257 restrains the handle 98 to an appropriate side of the rod 250. A pump actuator 256 is welded to the rod 250 and engages a spring biased assembly 258 which establishes a neutral position at the pump 82.

The assembly 258 includes a valve stem or plunger 260 and to which O'ring seals 261 are secured. The plunger 260 mounts inside a valve body 262 which is threaded to the pump body 89. Movement of the plunger 260 appropriately directs fluid in the pump body 89 to extend the pump piston 88.

A cap piece 262 is secured to the upper end of the plunger 260 with a threaded fastener 263. The cap piece 262 retains a spring 264 between the body 89 and the actuator arm 256, and the arm 256 contacts the end of the fastener 261 and/or end of the plunger 260. As the handle 98 is pulled to induce the plunger 260 to force fluid to raise the piston 88, the spring 264 counters the motion and biases the handle 98 to the neutral position.

Pushing on the handle 98 induces a linkage arm 258, which is also welded to the rod 250, to depress a relief valve 99 and direct fluid in the pump body 89 to permit the arm 84 to descend. The rate of descent can be varied by jogging the handle 98 into and out of engagement with the valve 99. Modifications have also been provided to the relief valve 99 to control or slow the rate of descent, which modifications are discussed in greater detail below with reference to FIG. 4.

With attention to FIG. 4, in lieu of a conventional rotary relief valve, an axial, push action relief valve 99 is provided. A plunger or valve stem 270 is biased by a spring 272 which mounts within a valve body 274. The plunger 270 manipulates a ball check 276 which is biased in a bore 278 of the body 274 by a second spring 280. Upon releasing the ball 276 from a mating valve seat 282, liquid can pass from the piston cylinder to the reservoir at the pump body 89 via a port 284. The volume of liquid is partially reduced by a slot 286 in the outer surface of the body 274 which re-directs a portion of the fluid flow in a closed loop. The re-direction of a portion of the fluid reduces the rate of descent of the arm 84.

Returning attention to FIG. 2, the pump 82 and lift arm 84 are secured to the column piece 52 at a pivot collar 100. The collar 100 includes an extension piece 101 which is welded to the column piece 52, and which offsets a pivot bushing (not shown) that is welded to an upper surface of the extension 101. A pair of plates 102, 104 extend from the arm 84 and are secured to the pivot bushing with a through fastener 106. Another fastener 107 secures the ends of the plates 102, 104 on the opposite side of the column piece 52 to the base plate 94 and the pump 82. As the piston 88 extends and retracts with the user directed motion of the handle 98, the arm 84 rotates about the fastener 106.

The pivot arm 84 is constructed of three tubular pieces 110, 112 and 114. The piece 110 projects from the plates 102, 104 to the piece 112 at an approximate angular orientation in the range of 80 to 90 degrees. The piece 114, in turn, projects from the piece 112 at an angular orientation in the range of 100 to 120 degrees. A seat frame 116 is rigidly secured to the end of the piece 114 and a padded cushion 118 is appended to the frame 116.

A pair of hip or wing supports 120, 122 project from the seat frame 116. The wing supports 120, 122 are each pivotally secured to the frame 116 at a retained fastener 124. A padded collar 126 mounts about a rigid core piece 128 of each wing 120, 122.

Either of the wings 120, 122 can be rotated parallel to the seat frame 116 to facilitate user access to the assembly 2. Once seated, each wing support 120, 122 is normally rotated, as depicted, to engage or restrain the hip region of the occupant. Minimal contact is made with the occupant. Once erect, the assemblies 120, 122 laterally stabilize the occupant, as necessary, who is otherwise also stabilized via the chest support 10, leg support 12 and heel restraint 28.

Figure 5:
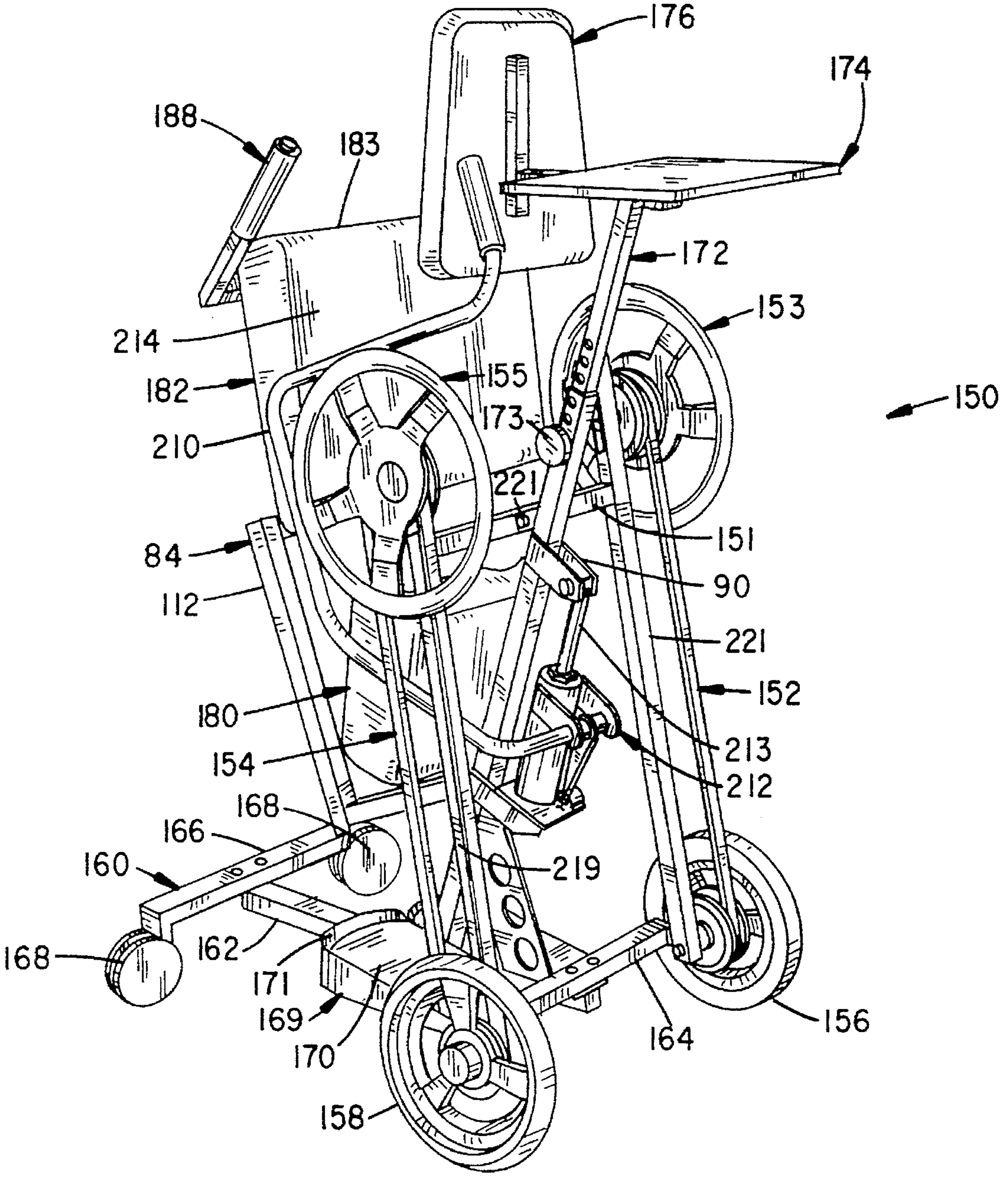
FIG. 5 is a perspective drawing of a mobile, hand driven standing aid.
Figure 6:
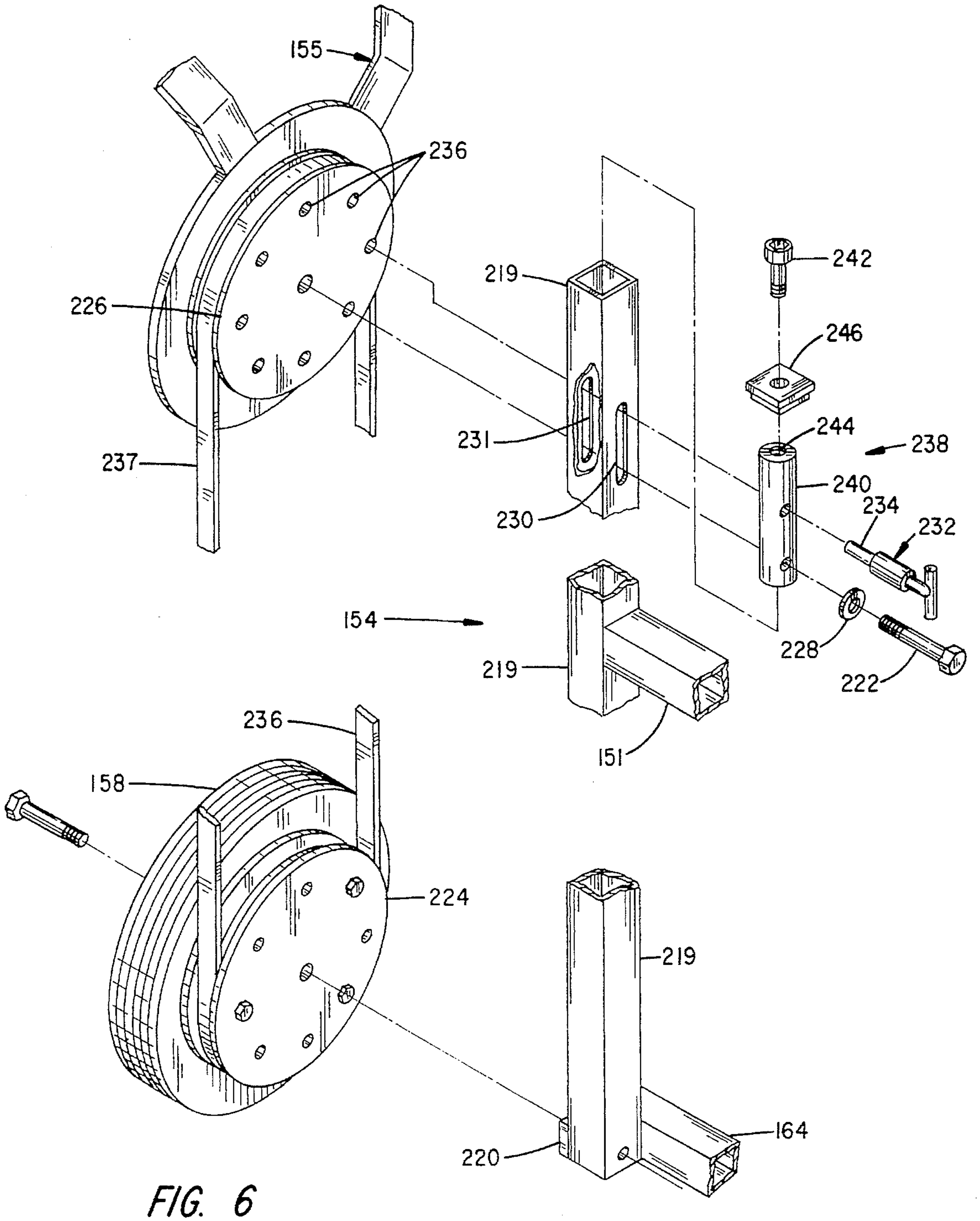
FIG. 6 is a perspective drawing of the hand drive linkage assembly.

Referring to FIGS. 5 and 6, an alternative, mobile standing assembly 150 is shown. The assembly 150 is substantially similar to the assembly 2 with the exception of appropriate modifications to provide independent, manual drive linkages 152 and 154 to each of a pair of drive wheels 156 and 158. More of the details of the drive assemblies 152 and 154 are described with respect to FIG. 6.

A base frame 160 includes a fixed length longitudinal member 162 and fore and aft stabilizers 164 and 166. If desired, the member 162 and/or stabilizers 164, 166 can be constructed to telescope, as described above for the member 16.

A pair of casters 168, which are rotatable at horizontal and vertical axes, project from the aft stabilizer 166. Depending upon the ground surface, the type of casters 168 can be varied. Commercially available furniture casters are presently used.

An elevated, molded foot restraint 169 is fastened along the member 162 with appropriate fasteners (not shown). The restraint 169 provides conformal foot pads 170 having integral heel restraints 171. The position of the foot restraint 169 along the member 162 can be adjusted to provide proper weight distribution to stabilize the assembly 150 and the occupant under stationary and moving conditions.

The support column 172 projects from the member 162 to a working platform 174. The height of the platform 174 can be adjusted at a threaded hand fastener 173, which mates with holes in the vertical support column 172. A padded chest support 176 telescopes from beneath the platform 174. The support 176 is contoured to provide upper trunk stability and contact a greater area of the thoracic cavity than the assembly 2.

A leg restraint 180 is secured to the column 172. The restraint 180 is substantially similar to the leg restraint 12 and provides a pair of conformal vertical channels to capture the knee/shin areas of the occupant's legs.

Also secured to the column 172 is a seat/hip support assembly 182, which is substantially similar to the assembly 14. A pair of pivoting wing arms 188 mount to the seat platform 183. In combination, the chest support 176, leg restraint 180, seat platform 183, wing arms 188 and foot restraint 169 confine the occupant to the assembly 150, once the seat/hip support 182 is fully raised to place the occupant in an erect position.

Figure 7:
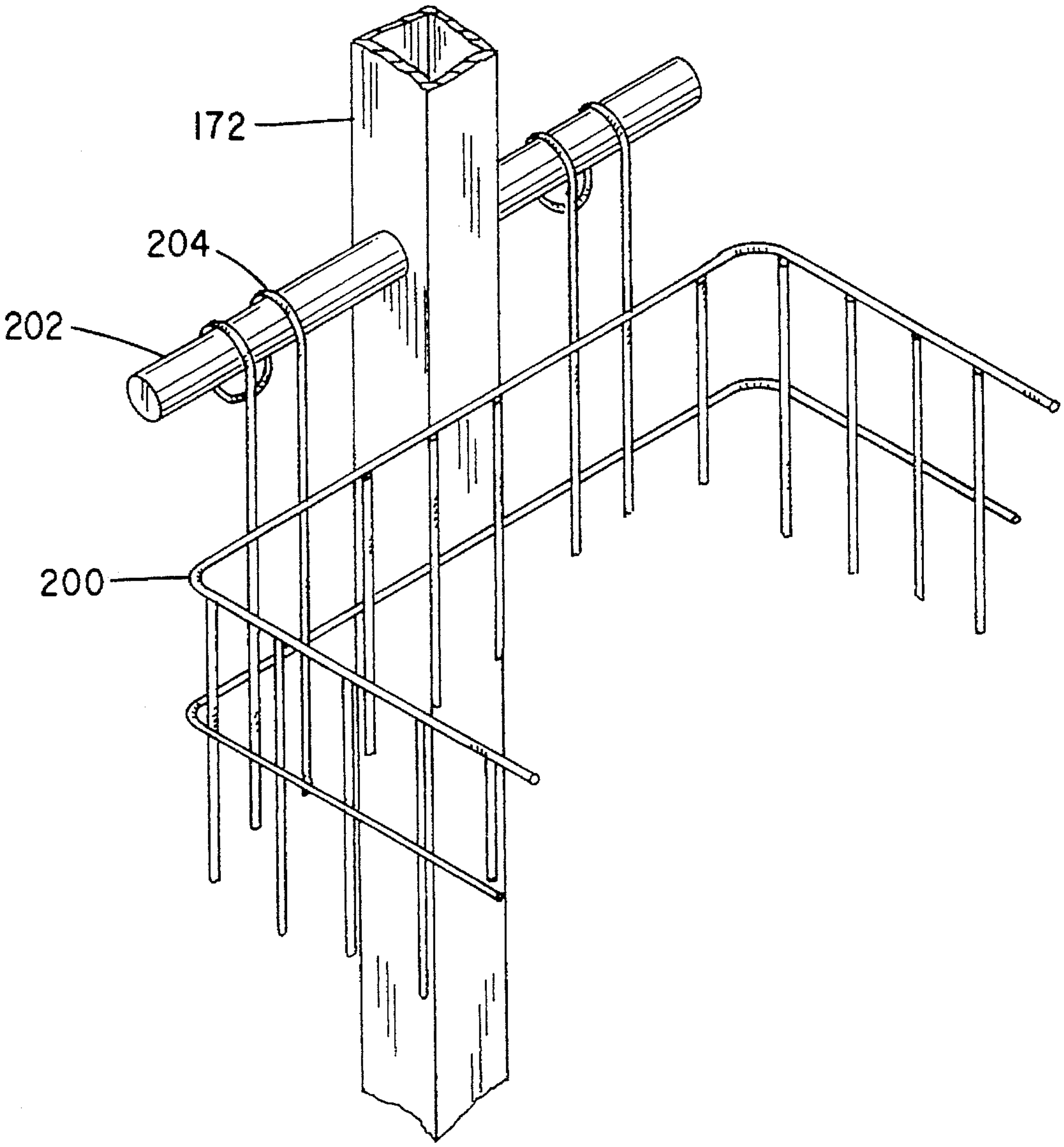
FIG. 7 is a perspective drawing, shown in partial cutaway, of a detachable accessory basket which is useable with either support assembly.

A utility basket 200, shown in partial cutaway at FIG. 7, is secured to the column 172 at a stub piece 210 which projects from the column 172. U-shaped portions 204 of the basket restrain the basket 200 to the stub piece 202.

The vertical position of the seat support 182 is determined by a pump handle 210 which operates in relation to a hydraulic pump 212. Operation of the handle 210 induces an extension and retraction of a piston 213, which action raises and lowers the seat platform 183.

Mobility is obtained with the hand wheels 153, 155, which cooperate with the drive wheels 156, 158 and drive linkage assemblies 152, 154. FIG. 6 depicts various details of the independent drive assemblies 152 and 154.

The drive linkages 152, 154 are supported to a pair of vertical frame members 219, 221. A cross frame member 151 is welded to the upper ends of the members 219, 221 and the cross member 151 is fastened to the column 172 at a clamp plate 221. A lower end of the drives 152, 154 is secured to the stabilizer 164, which is fastened to the column 172. Although only the drive 154 is depicted in detail, each drive 152, 154 is identical to the other. The drive 154 versus the drive 152 is depicted and described in detail only as a matter of convenience.

Referring to FIG. 6, the drive wheel 156 and the tubular frame member 219 are secured to the stabilizer 164 at an offset plate 220. The plate 220 is welded to the end of the stabilizer 164. An axle bolt 222 mounts through the plate 220, wheel 158 and frame member 219. A V-belt pulley 224 is permanently secured to the back of the wheel 156 and rotates in unison with the wheel 156. Spacers, bearings or bushings (not shown) are provided to assure smooth rotation of the wheel 158.

A second V-pulley 226 is permanently secured to an inside surface of the hand wheel 155. The hand wheel 155 is secured to the frame member 219 with a smooth shouldered axle bolt 228. The bolt 228 mounts within slots 230, 231 formed into the member 219. The slots 230, 231 also receive a detent 232.

The detent 232 includes a spring biased, locking or latch pin 234 which selectively mates with one of a number of apertures 236 at the back of the pulley 226. That is, once the assembly 150 is manually maneuvered to a desired location, upon engaging the detent 232, the pin 234 is extended and latched to the pulley 226 to restrain further movement.

A drive belt 237 extends between the pulleys 224 and 226. The mounting of the pulleys 224 and 226 to the member 219 assures a proper vertical alignment of one to the other, and minimizes tracking difficulties with the belt 237.

Proper belt tension is established with a tensioner 238 which cooperates with the slots 230, 231. The tensioner 238 includes a captured bushing 240. Apertures 242, 244 laterally extend through the side of the bushing 240 and receive the stub axle 228 and detent 232.

The bushing 240 mounts inside the frame member 219 and is free to move up and down in relation to movement of a threaded adjuster 242 that mates with a longitudinal bore 244 of the bushing 240 and a cap piece 246. The cap piece 246 rigidly mounts to the end of the member 219. Upon appropriately rotating the adjuster 242, the bushing 240, stub axle 234 and detent 232 are raised or lowered to provide a desired tension at the drive belt 232.

While the invention has been described with respect to its alternatively considered constructions, it is to be appreciated still other constructions may be suggested to those skilled in the art. The appended claims should be construed to include all of those equivalent embodiments within the spirit and scope thereof.

What is claimed:

1. Mobile support apparatus for lifting and lowering a user between seated and standing postures, comprising:

a) a framework including 1) a base, 2) a non-extensible column mounted upright to said base, and 3) first and second wheels secured to said base to rotate and move said framework;

b) a seat;

c) chest support means for supporting a user's chest in a standing posture;

c) leg restraint means for restraining the user's legs in a standing posture;

d) pump means secured to said column and including a piston and a handle for manually extending and retracting the piston in response to the user's movement of said handle; and e) posturing means including a support arm secured at one and said seat and at an opposite end to said pump means and further secured to a pivot at said column for continuously supporting the user between a seated and a standing posture, wherein reciprocal movement of said piston rotates said seat between a transverse orientation to said column at a user seating position and a parallel, displaced orientation to said column at a user standing position, and wherein at said user standing position the seat supports the user to engage said chest support means and said leg restraint means, whereby the user is at all times supported as the seat rotates between the user seating and standing positions in response the axial movement of the piston.

2. Apparatus as set forth in claim 1 including drive means having a hand wheel for rotating said first and second wheels to propel said framework.

3. Apparatus as set forth in claim 2 including first and second hand wheels, a plurality of pulleys secured to said first and second hand wheels and to said first and second wheels, and first and second belts trained between said pulleys at said first hand wheel and first wheel and said second hand wheel and second wheel.

4. Apparatus as set forth in claim 3 including means for selectively locking each of said first and second hand wheels to prevent rotation.

5. Apparatus as set forth in claim 3 including tensioning means for adjusting the tension of each of said first and second belts.

6. Apparatus as set forth in claim 5 wherein said tensioning means comprises a slide piece mounted within said framework, an axle mounted to project from said slide piece and a slot in said framework to support one of said first and second hand wheels, and means for axially displacing said slide piece to adjust the belt tension.

7. Apparatus as set forth in claim 6 wherein said tensioning means includes detent means which engages at least one aperture at the one of the first and second hand wheels for selectively preventing rotation.

8. Apparatus as set forth in claim 1 including a table top and means for securing said table top to telescope relative to said column and for fixing said table top at a selected elevation.

9. Apparatus as set forth in claim 1 including a detachable basket secured to said column and wherein the leg restraint comprises first and second cushioned channelways.

10. Apparatus as set forth in claim 1 wherein said seat means includes first and second wings and means for pivoting said first and second wings between coplanar orientation to said seat at the user seating position and a transverse orientation to said seat at the user standing positin and wherein the first and second wings support the user's hips at the user standing position.

11. Apparatus as set forth in claim 1 wherein said base includes means for varying the length of said base comprising first and second longitudinal members which telescope from one another and clamp means having first and second transverse wings for fixing the exposure of one of said first and second members relative to the other and wherein said first and second wings restrain the heels of the occupant.

12. Apparatus as set forth in claim 1 wherein said handle engages an axially extensible valve stem of said release means, such that movement of said handle to one extreme of a range of movement engages said valve stem and releases the piston.

13. Apparatus as set forth in claim 12 wherein said pump means includes means for biasing movement of said handle to a center, neutral position.

14. Mobile support apparatus for lifting and lowering a user between seated and standing postures, comprising:

a) a framework including 1) a base, 2) non-extensible column mounted upright to said base, and 3) first and second wheels secured to said base, and 4) drive means, including first and second hand wheels, a plurality of pulleys secured to said first and second hand wheels and to said first and second wheels, and first and second belts trained between said pulleys at said first and wheel and first wheel and said second hand wheel, for propelling said framework in response to rotation of said first and second hand wheels by the user;

b) a seat;

c) chest support means for supporting the user's chest in a standing posture;

c) leg restraint means for supporting the user's legs in a standing posture;

d) pump means having a piston secured to said column at a first pivot and a handle for manually extending and retracting the piston in response to movement of the handle; and e) posturing means, including a support arm secured at one end to said seat and to an opposite end to said pump means and further secured to a second pivot intermediate said seat and pump means, for continuously supporting the user between a seated and a standing posture wherein reciprocal movement of said piston rotates said seat between a transverse orientation to said column at a user seating position and a parallel, displaced orientation to said column at a user standing position, and wherein at said user standing position the seat supports the user to engage said chest support means and said leg restraint means, whereby the user is at all times supported as the seat rotates between the user seating and standing positions in response to axial movement of the piston.

15. Apparatus as set forth in claim 14 including tensioning means for adjusting the tension of each of said first and second belts and latch means for selectively locking each of said first and second hand wheels to prevent rotation.

16. Apparatus as set forth in claim 14 including a table top and means for securing said table top to telescope relative to said column and for fixing said table top at a selected elevation.

17. Mobile support apparatus for lifting and lowering a user between seated and standing postures, comprising:

a) a framework including 1) a base, 2) a non-extensible column mounted upright to said base, 3) first and second wheels secured to said base, 4) footrest means, and 5) drive means, including first and second hand wheels, a plurality of pulleys secured to said first and second hand wheels and to said first and second wheels, and first and second belts trained between said pulleys at said first hand wheel and first wheel and said second hand wheel and second wheel, for propelling said framework in response to rotation of said first and second hand wheels by the user;

b) a seat;

c) chest support means for supporting the user's chest in a standing posture;

c) leg restraint means or supporting the user's legs in a standing posture;

d) pump means having a piston secured to said column at a first pivot and a handle for manually extending and retracting the piston in response to movement of the handle and including means having a valve axially displaced by said handle in response to movement of the handle past a center neutral position for retracting the piston; and e) posturing means, including a support arm secured at one end to said seat and at an opposite end to said pump means and further secured to a second pivot intermediate said seat and pump means for continuously supporting the user between a seated and a standing posture, wherein reciprocal movement of said piston rotates said seat between a transverse orientation to said column at a user seating position and a parallel, displaced orientation to said column as a user standing position, and wherein at said user's standing position the seat supports the user to engage said chest support means and said leg restraint means, whereby the user is at all times supported as the seat rotates between the user seating and standing positions in response to axial movement of the piston.

18. Apparatus as set forth in claim 17 including first and second tensioning means for adjusting the tension of each of said first and second belts.

19. Apparatus as set forth in claim 18 wherein each of said first and second tensioning means comprises a slide piece mounted within said framework, an axle mounted to project from said slide piece and through a slot in said framework to support one of said first and second hand wheels, and means for vertically displacing said slide piece to adjust the belt tension.

20. Apparatus as set forth in claim 19 wherein said tensioning means includes spring biased detent means for engaging at least one aperture at the one of the first and second hand wheels to selectively prevent rotation.

21. Apparatus as set forth in claim 17 including a table top, means for securing said table top to telescope relative to said column and for fixing said table top at a selected elevation.

22. Apparatus as set forth in claim 17 including means for securing said chest support means to telescope relative to said column and for fixing a selected extension of said chest support.

23. Apparatus as set forth in claim 17 including first and second tensioning means for adjusting the tension of each of said first and second belts and means for selectively locking each of said first and second hand wheels to prevent rotation.

* * * * *